Patented Apr. 28, 1953

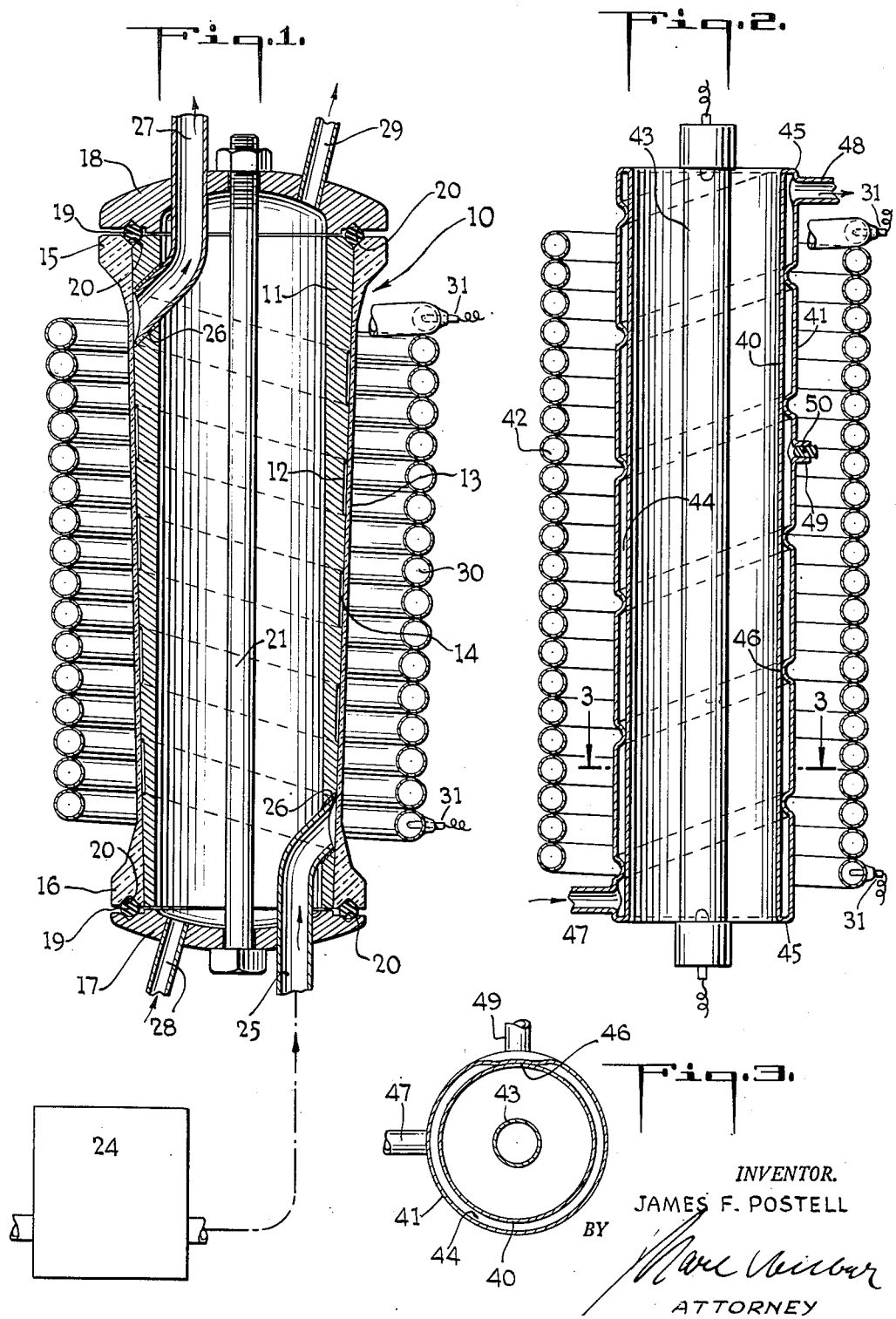

2,636,991

UNITED STATES PATENT OFFICE 2,636,991

METHOD AND APPARATUS FOR IRRADIATING LIQUIDS

James F. Postell, Union, N. J., assignor to Hanovia Chemical and Manufacturing Company, Newark, N. J., a corporation of New Jersey Application May 12, 1950, Serial No. 161,600

3 Claims. (Cl. 250—47)

This invention relates to the irradiation of liquids and is concerned in particular with a method of and apparatus for controlling the extent of irradiation of liquids.

The irradiation of liquids with ultraviolet rays for the production of biological reactions, such as the destruction of bacteria and other microorganisms, and photochemical reactions such as the production of vitamin D, is effective only where a number of factors are carefully controlled. One of these factors is the wave length of the radiations, e. g. the extent to which a given amount of radiant energy affects a biological or photochemical reaction depends upon the number of lines which are included in the ultraviolet range of the spectrum for the given radiation. This factor may be controlled within predetermined limits by the proper selection of one of the many different types of ultraviolet ray discharge lamps that are available on the market; those lamps having an envelope of fused quartz being permeable to radiations of shorter wave length than are the lamps having envelopes consisting of glasses of lesser silica purity than quartz.

Another of the factors affecting the extent of irradiation is the intensity of the radiant energy, this factor being dependent upon the wattage used to energize the lamp and upon the distance between the lamp and the liquid undergoing treatment. The manner of controlling the energy intensity is, therefore, obvious.

Still another factor affecting irradiation is the time period during which each particle of the liquid undergoing treatment is exposed to the radiant energy. It is to the proper control of this factor that many of the prior art efforts have been directed yet none have been entirely successful in attaining satisfactory control. Many of the prior art irradiation devices cause a thin film of liquid to flow by gravity over an inclined surface while other devices cause the flowing liquid to become mixed in order to present as many as possible of the reacting particles to the source of radiant energy. In either case, the result constitutes a compromise involving underexposure, overexposure, and the actual desired reaction.

The factors which determine the extent to which each particle of the liquid being treated is exposed to ultraviolet rays are the thickness of the body of the liquid, and the rate at which the liquid flows past the source of energy. If the liquid body has a thickness greater than that through which ultraviolet rays may penetrate, then, in the absence of agitation of the liquid, the particles furthest removed from the source of rays will not become irradiated; however, even with agitation, an operator cannot definitely insure that each and every particle of the liquid will become irradiated. It is possible even with thorough agitation that a liquid particle in a body having a thickness greater than that through which ultraviolet rays may effectively penetrate, may never become exposed to a ray during the entire period of treatment.

The maximum thickness of a film of a given liquid through which ultraviolet rays will penetrate can be determined by known spectroscopic methods. By limiting the depth of the film to that through which ultraviolet rays will penetrate and by using a predetermined wave length and intensity of irradiation as explained above, there remains only the factor of the rate of flow of the liquid to be controlled in order to obtain such irradiation which will be as complete as desired and which will give predetermined results.

It is, therefore, a general object of this invention to provide a method and apparatus for controlling the time period during which a liquid is subjected to irradiation. Another object is the provision of a method and apparatus for maintaining a predetermined course of flow of a liquid through a chamber while the liquid is being penetrated by ultraviolet rays. It is a more specific object of this invention to provide for the treatment of a liquid film of predetermined depth by exposing it to ultraviolet rays of predetermined wave length and intensity and by controlling the rate at which the liquid flows past the source of the ultraviolet rays. Further objects and various advantages of this invention will become apparent from the following description of the preferred forms thereof, reference being made to the accompanying drawings in which:

Figure 1 is a sectional elevation of one form of the irradiation device of this invention, Figure 2 is a sectional elevation of another form of the apparatus of this invention, and Figure 3 is a sectional plan on the line III—III of Figure 2.

In order to control the rate of flow of the liquid while maintaining the other correlated factors which affect irradiation at constant values, I provide a vertically extending helical passageway of predetermined depth, and I introduce the liquid to be treated into the lower end of the helix, thereby causing the liquid to flow upwardly through the passageway. By flowing the liquid in this manner, I am able to reduce the mixing that ordinarily occurs in a flowing stream, whereby each liquid particle travels through the passageway in substantially the same time period as is required for any other liquid particle. Furthermore, I maintain the temperature of the liquid at a constant value while it travels through the helical passageway so that there will be no change in its viscosity which would offset the rate of flow of the liquid.

Referring now to the embodiment shown in Figure 1, the numeral 10 indicates a vertical cylinder which comprises an inner tube 11 and a jacket 13, the inner tube being formed preferably of stainless steel. Recessed into the outside surface of the tube 11 is a helical and flat groove 12, the maximum depth of which does not exceed the maximum thickness to which a film of the liquid to be treated may be formed before it becomes opaque to ultraviolet rays. When it is contemplated to use the cylinder from time to time for irradiating various liquids of different ultraviolet ray transparencies, then the depth of the groove 12 should not exceed the maximum thickness to which a film of the least transparent liquid may be formed before it becomes impermeable to ultraviolet radiations. In treating blood serum, for example, it has been found that the film thickness should not exceed 0.009 inch.

The jacket 13, being substantially the same length as the tube 11 and telescoped on the outside thereof, is formed of a material that is transparent to wave lengths of 2600 A. and below. The preferred material for forming the jacket is quartz, however, for some purposes the jacket may be formed from one of the well known ultraviolet ray transparent synthetic resins or from glasses of lesser silica purity than quartz. The inside surface of the jacket 13 and the outside surface of the metal tube 11 are ground and lapped to a high rouge polished finish so that they will mate when the tube is placed within the jacket. The tube and jacket are slightly tapered, the conical sections formed by the contacting surfaces thereof being of greater diameter near their top ends. This taper is formed in order to permit of more ease in machining of the surfaces and to obtain a tighter fit therebetween. The inside surface of the jacket 13 cooperates with the groove 12 to form a flat passageway 14 of predetermined depth, through which the liquid travels while it is being irradiated. Each end of the jacket is buttressed to form the outwardly extending portions 15 and 16, which construction strengthens the jacket and supports the cushioning means as hereinafter explained.

The cap 17 closes the bottom end of the cylinder 10, while the cap 18 is placed on the top end of the cylinder. Between the abutting portions of the caps and the buttressed ends of the jacket are placed the cushioning rings 19, which are formed preferably of a synthetic rubber product, the caps and the ends of the cylinder having retaining grooves as shown at 20 for holding the cushioning rings in place. The end caps are held tightly in place by means of a tie rod or bolt 21.

The liquid to be treated passes from a flow control unit generally indicated at 24 and into the inlet pipe 25 to the passageway 14. The pipe 25 extends within the tube 11 to which it is welded or otherwise fixed as shown at 26. After the liquid has traveled through the passageway, it is expelled through the outlet pipe 27, which is connected to the outlet end of the passageway similarly as the inlet pipe 25. In order to maintain the viscosity of the liquid being treated at a constant value, a fluid at a predetermined temperature is introduced into the tube 11 through the conduit 28 and is exhausted through the fluid outlet conduit 29. The tube 11, therefore, constitutes a heat exchanger between the constant temperature fluid and the liquid being irradiated.

To irradiate the liquid as it travels upwardly through the helical passageway, there is provided a lamp 30 having tightly wound coils, as shown, around the outside of the jacket 13, and radially spaced from the jacket by a predetermined distance. The envelope of the lamp consists preferably of fused quartz, however, it may be formed from a glass of lesser selica purity than commercially pure quartz, so long as it is appreciably transparent to ultraviolet rays, e. g. wave lengths below 2600 A. When it is desired to sterilize the liquid being irradiated, as for example, blood, blood plasma, blood serum, vaccines, etc., it is customary to use a lamp containing an inert gaseous filling mixed with mercury at relatively low pressure. Such a lamp is commonly referred to by those skilled in the art as being a "cold quartz lamp." When it is desired to use the device of this invention for the production of photo-chemical reactions such as producing vitamin D, the lamp may be of the well known high pressure mercury arc type. The electrodes 31 of the lamp are connected to a source of controlled electrical energy, which is not shown on the drawing, the manner of energizing such lamps, being well known to those skilled in the art.

By using the device shown in Figure 1, it is possible to control all of the factors affecting irradiation of a liquid with ultraviolet rays so that the reaction will occur to the extent of completeness desired. The wave length of the rays used is constant as is their effective intensity which is fixed by the wattage of the energizing circuit and by the distance of the lamp from the passageway 14. The only factor remaining to be controlled is the exposure time, and this factor has been reduced by this invention to that of merely regulating the rate of flow of the liquid through the passageway. The liquid being treated is raised upwardly by the incoming liquid, and by causing it to travel in a helical path the agitation is reduced, so that each liquid particle travels through the passageway in substantially the same time period as does any other liquid particle. Although the lamp 30 is shown as being tapered to parallel the sides of the cylinder 10 and thereby obtain constant intensity of radiation on the liquid, it is apparent that the lamp need not be so tapered, and that it may be vertical since each liquid particle will be penetrated by rays of the same overall intensity as any other liquid particle.

A further advantage of the device shown in Figure 1 is that it may be easily disassembled for purposes of cleaning. Also, contamination of the liquid by the surrounding atmosphere is avoided.

Figures 2 and 3 illustrate a liquid irradiation cylinder having up to twice the capacity of the form shown in Figure 1. In this modification, the inner tube 40 and the outer jacket 41 are both formed of a material which is transparent to ultraviolet rays, and in addition to the coiled lamp 42, which is similar in construction and operation to the lamp 30 shown in Figure 1, a lamp 43 is placed within the cylinder and along its axis. Since in this modification, the ultraviolet radiations penetrate through the liquid from the opposite sides thereof, the channel 44 which is provided by the space between the inner tube and the outer jacket may be up to twice the thickness of the passageway 14 in the form shown in Figure 1.

The ends of the inner tube 40 and the outer jacket 41 are fused together as shown at 45. A spiral indentation 46 is formed in the outer jacket so that the inner portion of the indentation abuts the outer surface of the tube whereby liquid which is introduced by the inlet pipe 47 will travel upwardly through the channel 44 in a helical path similarly as in the form shown in Figure 1. In order to reduce stirring of the liquid as it enters the helical channel, the inlet pipe 47 is formed to communicate with the channel in a tangential manner as shown in Figure 3. The liquid after being irradiated is exhausted through the outlet pipe 48.

Where it is desirable to use one cylinder for irradiating different liquids, and one of these liquids requires a substantially shorter time period of exposure than the other liquids, it is likely that too great an increase in the rate of flow of said one liquid may produce undesirable agitation, whereby some of the liquid particles will remain in the channel for a longer period than is required, thus resulting in over-exposure. In such a case, an alternative outlet pipe 49 may be provided along the side wall of the cylinder to reduce the effective length of the channel 44 so that the rate of flow of that liquid requiring only a short time of exposure, may be reduced below that speed which will result in agitation of the liquid. This pipe 49 should be formed of a material such as stainless steel which is opaque to ultraviolet rays, so that no irradiation of the liquid will occur as it passes therethrough. When the pipe 49 is not in use, it may be sealed by means of a plug 50 which extends to the inside surface of the channel. The liquid may be cooled so as to maintain its viscosity at a constant value by causing a cooling fluid to circulate about the cylinder in any well known manner, such as by blowing dry cool air against the surfaces of the cylinder.

Without further description, it is thought that the features and advantages of the invention will be readily apparent to those skilled in the art, and it will, of course, be understood that changes in the form and minor details of construction may be resorted to, without departing from the spirit of the invention and scope of the appended claims. For example, the inner tube 11 of the modification shown in Figure 1 may be formed of an ultraviolet ray transparent material and the outer jacket of opaque material. Also instead of forming a groove in the surface of the inner tube shown in Figure 1 or an indentation in the outer jacket shown in Figure 2, the helical passageways may be formed by wrapping a thin strip of material around the inner tube.

What I claim is:

1. An apparatus for irradiating a liquid comprising a vertical inner member of circular cross-section, a co-axial outer tubular member closely fitting around said inner member, at least one of said members being formed of a material that is transparent to ultraviolet rays, a thin, flat spiral passage means between said members arranged to form a helical channel extending substantially throughout the height of at least one of said members, said passage means appearing as a series of discrete chambers in a vertical cross-sectional view of said apparatus, the maximum depth of said means being twice that thickness of a body of the liquid to be irradiated through which ultraviolet rays may pass, means for closing the ends of said channel, a bottom inlet and a top outlet communicating with said channel, and an ultraviolet ray lamp adjacent that member which is transparent to said rays, whereby the fluid to be irradiated is passed uniformly and vertically upwardly unaccompanied by any agitation and each particle of the liquid travels through the channel in substantially the same time period as is required for any other liquid particle.

2. An apparatus for irradiating a liquid according to claim 1 wherein said inner member is a hollow vertically disposed downwardly tapering metallic member of circular cross-section having a thin flat spiral groove in the outer surface thereof, the depth of said groove being equal to that thickness of a body of said liquid through which ultraviolet rays may pass, said outer member being a thin walled quartz member extending the length of said inner member, said lamp being disposed around said outer member and spaced therefrom by a predetermined distance, a top cap and a bottom cap member for closing the ends of the space between said inner and outer members, means for admitting fluid to the bottom end of said groove at a controlled rate of flow, means for exhausting said liquid from the top of said groove, and means for admitting and exhausting a heat exchange fluid through said inner member.

3. Apparatus for irradiating a liquid according to claim 1 wherein said inner member is a quartz tube and said outer member is a second co-axial quartz tube, said tubes being of circular cross-section, the inside surface of said outer tube being radially spaced from the outer surface of said inner tube by a maximum distance of twice the thickness of a body of said liquid through which ultraviolet rays will pass, a spiral indentation formed in the outer tube with the inner portion thereof abutting the outside surface of said inner tube whereby said helical channel is formed in the space between said tubes and extending throughout the length thereof, said channel inlet being tangentially arranged, the ends of said tubes being joined to seal the space therebetween, said lamp being disposed within said inner tube and extending along the axis thereof, and a second co-axially arranged lamp around the outside of said outer tube and spaced therefrom by a predetermined distance.

JAMES F. POSTELL.

References Cited in the file of this patent

UNITED STATES PATENTS

| Number | Name | Date |
| --- | --- | --- |
| 1,145,140 | Henri et al. | July 6, 1915 |
| 1,204,721 | Von Recklinhausen | Nov. 14, 1916 |
| 1,670,217 | Scheidt | May 15, 1928 |
| 1,735,610 | Goodal et al. | Nov. 12, 1929 |
| 2,034,184 | Hartman | Mar. 17, 1936 |
| 2,309,124 | Knott | Jan. 26, 1943 |
| 2,340,890 | Lang et al. | Feb. 8, 1944 |
| 2,452,201 | Levinson et al. | Oct. 26, 1948 |
| 2,501,290 | Pequignot | Mar. 21, 1950 |